United States Patent [19]

Alvite'

[11] Patent Number: 4,784,421

[45] Date of Patent: Nov. 15, 1988

[54] INTERCHANGEABLE TOOL MOUNTING MECHANISM FOR ROBOTS

[75] Inventor: Joseph G. Alvite', Wyoming, Minn.

[73] Assignee: Mecanotron Corporation, Minneapolis, Minn.

[21] Appl. No.: 853,674

[22] Filed: Apr. 18, 1986

[51] Int. Cl.$^4$ ............................................. B25J 15/04
[52] U.S. Cl. .................................... 294/86.4; 29/568; 294/88; 294/119.1; 901/37; 901/41
[58] Field of Search ................. 294/86.4, 88, 119.1, 294/902, 907; 29/568; 269/279, 280, 283; 414/1, 4, 5, 729, 730, 738, 739, 741; 901/30, 31, 36, 37, 39, 41, 42, 50

[56] References Cited

U.S. PATENT DOCUMENTS

| | | | |
|---|---|---|---|
| 3,247,978 | 4/1966 | Neumeier | 414/735 |
| 3,525,382 | 8/1970 | Devol | 901/50 X |
| 3,848,753 | 11/1974 | Borg et al. | 414/739 |
| 4,042,122 | 8/1977 | Espy et al. | 414/741 X |
| 4,046,263 | 9/1977 | Cwycyshyn et al. | 414/744 R |
| 4,133,022 | 1/1979 | Moore et al. | 361/415 |
| 4,252,358 | 2/1981 | Klebs | 294/119.1 X |
| 4,281,447 | 8/1981 | Miller et al. | 29/568 |
| 4,525,918 | 7/1985 | Puritz | 29/568 |
| 4,537,453 | 8/1985 | Takeuchi | 339/33 |
| 4,551,903 | 11/1985 | Bisiach | 29/568 |
| 4,561,506 | 12/1985 | Booker | 901/41 X |
| 4,591,198 | 5/1986 | Monforte | 294/88 |
| 4,620,362 | 11/1986 | Reynolds | 294/907 X |
| 4,660,274 | 4/1987 | Goumas et al. | 901/31 X |
| 4,664,588 | 5/1987 | Newell et al. | 901/41 X |
| 4,676,541 | 6/1987 | Lord et al. | 294/88 |

FOREIGN PATENT DOCUMENTS

| | | | |
|---|---|---|---|
| 648776 | 11/1962 | Italy | 294/119.1 |
| 149167 | 11/1979 | Japan | 294/86.4 |

Primary Examiner—Johnny D. Cherry
Attorney, Agent, or Firm—Orrin M. Haugen; Thomas J. Nikolai; Frederick W. Niebuhr

[57] ABSTRACT

A system for interchangeably mounting tools on a robotic arm includes a clamping assembly having a core attached to and extending longitudinally from the arm, and two opposed clamping members mounted for transverse sliding on the core. A tool support member is held in the clamping assembly, when it is closed, by guide pins extended transversely from the clamping members engaged with legs of the tool support member. The support member and clamping members have conduit portions that form continuous fluid conduits and electrical paths when the support member is secured in the clamping assembly. A collet housing is supported relative to the tool support member by a linear extension device, a compliant wrist, and an overload protect wrist, which together allow limited longitudinal, transverse and angular displacement of the collet housing relative to the arm.

11 Claims, 5 Drawing Sheets

ANGULAR DEVIATION

INTERCHANGEABLE TOOL MOUNTING MECHANISM FOR ROBOTS

BACKGROUND OF THE INVENTION

Over the past few years, rapid technological advances have occurred in automatic manufacturing. Among these are improvements to robotic quick change tooling systems, which render robots more cost effective by increasing their flexibility and versatility, and by reducing the "down-time" in which the robot is inoperative during changing or inspection of tools.

For example, U.S. Pat. No. 4,551,903 to Bisiach granted Nov. 12, 1985 shows a coupling device including a hollow cylinder 16, a central body 19 and a crown gear 40, mounted to a tool holder head 10 at the end of a robot's arm. The arm is moved to carry the coupling device to a tool connection plate held by a magazine 90. A rack 50 is mounted on the magazine, and moves vertically to rotate crown gear 40 into a locking position. This secures the tool to head 10, and releases the connection plate from the magazine.

A tool holder, shown in U.S. Pat. No. 4,525,918 to Puritz granted July 2, 1985 includes a sleeve 3 and a component 25 having a conical shaft 26 that fits into a conical bore 2 in the sleeve. The shaft also has a locking groove 29, with locking bolts 12 mounted in the sleeve and extending into the locking groove to secure the shaft. Centering pins 4 align the sleeve and component.

Yet another tool changing apparatus is shown in U.S. Pat. No. 4,046,263 to Cwycychyn et al granted Sept. 6, 1977. A support assembly 28, mounted to a manipulator arm 20, has a pyramid-shaped projection 38 that extends into an opening 42 in a plate 44 connected to a tool. A wedge member 36 on the support assembly slides downward into an opening in projection 38 to secure the plate to the arm.

While these and other tool changing systems are often satisfactory, they do not adequately meet the need for a system that allows rapid changing of tools, yet withstands high loads and protects the tool from falling from the robot in the event of a power failure. A tool's falling off of a robot arm may seem like a trivial event, until the expense of repairing or replacing such tooling is considered. Another concern is the damage that can occur to the robotic arm, tools, or a workpiece being manipulated by the tools, should the robot arm or tool contact a workpiece at a point other than that desired, for example in the course of finishing a workpiece or drilling a hole in the workpiece.

Therefore, it is an object of the present invention to provide apparatus for interchangeably supporting tools with respect to a robotic arm, and for permitting rapid changing of the tools.

Another object of the invention is to provide a means for supporting a tool on a robot arm, which can handle heavy payloads and can positively retain the tool in the event of interruption of power to the robotic arm.

Yet another object of the invention is to provide apparatus to support a tool on a robot arm, which permits a slight deviation of the robot arm from an ideal position, but prevents operation of the tool, should the deviation from an ideal arm position be too severe.

SUMMARY OF THE INVENTION

To achieve these and other objects, there is provided an apparatus for operatively and interchangeably supporting tools with respect to a robotic arm. The apparatus includes a core, and means for mounting a base of the core to an arm whereby the core extends outward from the arm in a longitudinal direction. The apparatus includes first and second clamping members and means for mounting the clamping members on opposite sides of the core for transverse movement on the core between a closed position with the clamping members relatively near each other, and an open position with the clamping members relatively remote from each other. At least one first guide member is mounted to the first clamping member and extends in the transverse directin toward the second clamping member. The apparatus includes a tool support member which includes a guide member receiving means associated with each first guide member. The tool support member is selectively positionable between the first and second clamping members to substantially align each receiving means with its associated guide member. Then, each guide member lockingly engages its associated receiving means as the clamps are moved to the closed position, thus to integrally secure the tool support member between the clamping members.

Preferably, both the clamping members and the tool support member have conduit portions formed therein. With the tool support member integrally secured between the clamping members, the various conduit portions combine to form fluid conduits and electrically conductive paths through the clamps and tool support member.

The core and transversely moving clamping members interlock transversely with the tool support member. Yet the tool, when held between the clamps, must be moved longitudinally for withdrawal from the clamps. Consequently, should there be an interruption in power to the core and clamps, they positively retain the tool against longitudinal movement, even though the clamps might move transversely toward their open position. Under all conditions, transverse clamping members can handle substantially greater payloads. Further, a plurality of tool support members can be provided, one joined to each of a desired number of tools, to permit rapid changing of tools on any given robot arm.

Another respect of the present invention is a collet housing for interchangeably mounting rotational tools. The collet housing includes a proximal inner housing section, a proximal outer housing section fixed to the inner section, and a distal housing section slidably engaged with the inner and outer housing sections. The inner and distal sections together define a longitudinal central collet opening. The inner section, outer section and distal section together form a housing actuating chamber surrounding and concentric with the collet opening. A substantially cylindrical collet is contained in the collet opening and has a plurality of tool gripping members at an outwardly flared distal end thereof. The tool gripping members are movable between an open or tool receiving position, and a closed or tool retaining position. Bearing means are provided between the collet and inner section, and also between the collet and distal section, to allow the collet to rotate relative to the housing.

A piston means at the proximal end of the distal housing section spans the transverse distance across the housing actuating chamber between the inner and outer housing sections. First and second fluid conduits are formed through the housing to the chamber on opposite sides of the piston means, whereby introduction of fluid to the actuating chamber through the first conduit tends to advance the distal housing section longitudinally away from the inner and outer housing sections, causing a distal portion of the distal section to engage the gripping members and move them to the closed position. Conversely, introduction of fluid to the actuating chamber through the second conduit means tends to retract the distal housing section from the distal end portion, thus to permit the gripping members to return to the open position.

A plurality of longitudinal fluid ports can be provided in the outer section and distal section, for transmitting fluids such as pressurized air or lubricating oil through the housing to a tool mounted in the collet. Further, one or more sensors can be embedded in the distal end of the distal housing section.

Rotational tools, for example drill bits, may be rapidly changed using the disclosed collet supporting apparatus. The single, annular chamber for opening and closing the collet is simpler and more reliable than multiple cylinders, and eliminates any problem of fluid imbalance between a plurality of actuator cylinders.

Another aspect of the present invention is an overload protection wrist for robotic applications. The wrist includes complementary first and second wrist segments. A connecting means joins the segments with respect to each other, and a biasing means urges the segments, when joined, away from one another to a select configuration with respect to one another. The connecting means permits limited displacement of the segments relative to one another away from the select configuration against the force of the biasing means. A sensing means is provided for determining when the segments are so displaced and by more than a predetermined amount.

Preferably the sensing means includes an optical sensor and a light source aligned with each other and integral with one of the segments. A position indicating member, integral with the other one of the segments, has an aperture formed therein and aligned with the sensor and light source. The aperture is of a select size to permit passage of light from the source to the optical sensor whenever the segments are displaced by no more than the predetermined amount.

Yet another aspect of the present invention is a compliant robotic wrist. The wrist has first and second wrist plates normally parallel to one another, spaced apart from one another and generally centered on a longitudinal axis. A wrist biasing means is provided between the plates for urging them longitudinally away from one another. First and second generally spherical indentations are formed in the outside surfaces of the first and second plates, respectively, and are substantially centered on the longitudinal axis. A wrist fastening means maintains the plates at a predetermined normal distance from each other against the force of the biasing means. The fastening means includes a shaft extended through first and second oversized central openings in the first and second plates, respectively. The fastening means further includes a first plate retention member fastened to one end of the shaft and having a convex surface positioned for slidable surface engagement with one of the indentations. A second plate retention member is fastened to the other end of the shaft, and has a convex surface positined for slidable surface engagement with the other indentation.

The biasing means preferably includes an elastically deformable tube substantially centered on the longitudinal axis, and a coil spring that spans the distance between the plates, is concentric with the tube, and is embedded in the tube.

A final aspect of the present invention is a fluid controlled expansion apparatus. The apparatus includes an extension housing forming and enclosing a cylindrical extension chamber. A first plate is disposed within the extension chamber to reciprocate longitudinally between an advanced position and a retracted position. A second plate is substantially aligned with the first plate and disposed outside of the extension housing. A plurality of rods, each with one end mounted to the first plate near its periphery and with its other end mounted to the second plate near its periphery, extend longitudinally between the plates. Each rod extends to an associated rod aperture formed in a transverse wall of the extension housing. First and second extension fluid conduits are formed through the extension housing and into the extension chamber, and on opposite sides of the first plate.

The compliant wrist and overload protection wrist may be used in combination on a system for mounting a particular tool, and thus will permit a desired angular and positional tolerance for performing repetitive tasks such as drilling holes or finishing surfaces. At the same time, should a required deviation from the normal orientation or position be too great, the overload protect wrist will prevent the tool from performing the intended function, thus to warn the operator that a deviation from tolerance has become too severe.

IN THE DRAWINGS

These and other features and advantages of the invention will become apparent upon a reading of the following detailed description, and upon reference to the drawings, in which.

DETAILED DESCRIPTION OF THE PREFERRED EMBODIMENT

Figure 1:
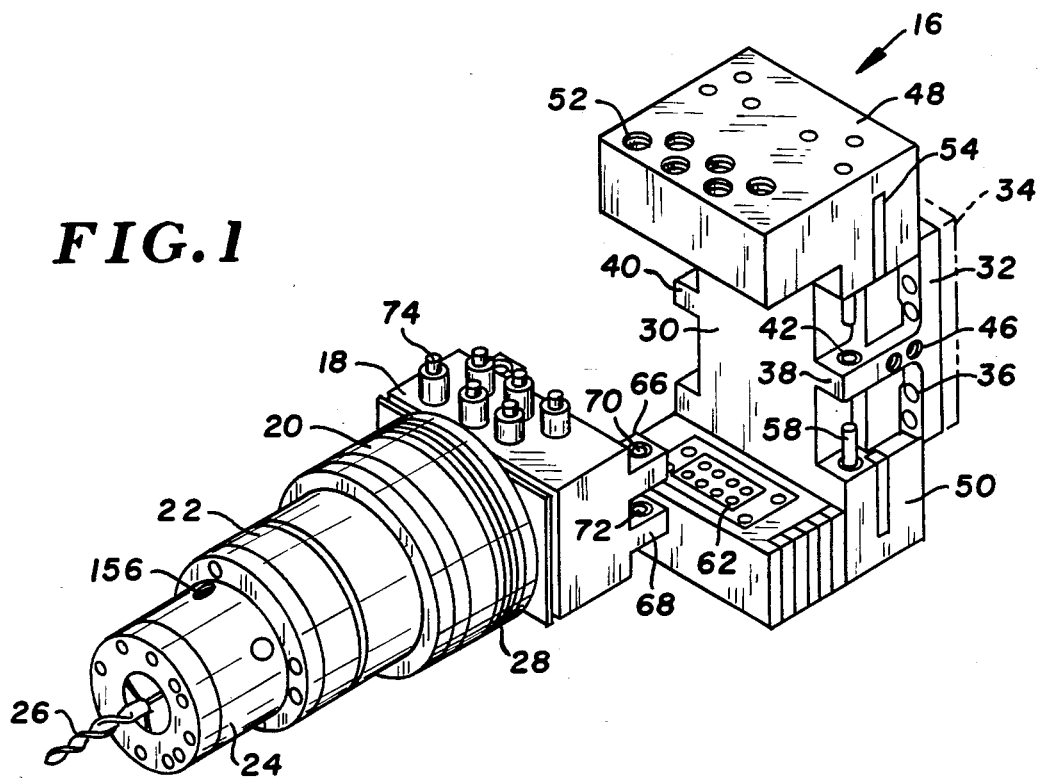
FIG. 1 is a perspective view showing apparatus for mounting a tool with respect to a robotic arm, and constructed in accordance with the present invention.
Figure 2:
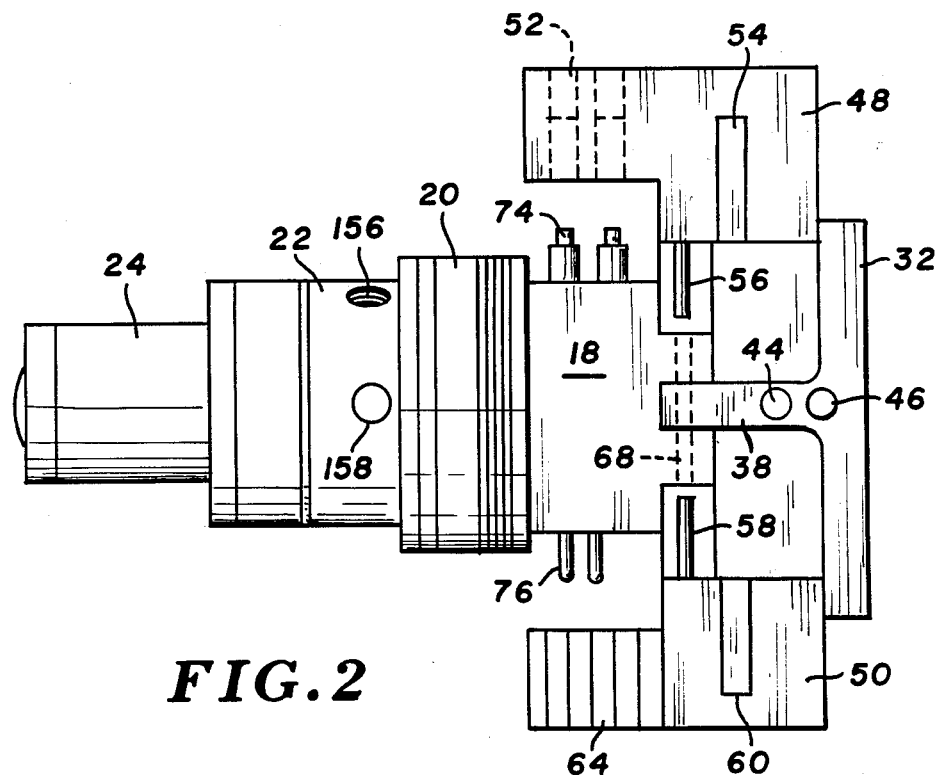
FIG. 2 is a side view of the apparatus of FIG. 1.

Turning now to the drawings, there is shown in FIGS. 1 and 2 a system for mounting a tool with respect to a robotic arm. Major components of the system include a clamping assembly 16, a tool support member 18 engaging the clamping assembly, an extension housing 20 connected to the tool support member, a motor housing 22 connected to the extension housing, and a collet housing 24 connected to the motor housing. The tool support member, extension housing, motor housing and collet housing preferably are generally centered on a longitudinal axis which is the axis of rotation for a tool such as a drill bit 26 extending from collet housing 24.

However, extension housing 20 affords, to motor housing 22 and collet housing 24, a limited angular and linear deviation from the longitudinal axis, as is later explained. A bellows 28 enclosing the extension housing permits this flexibility. Drill bit 24 can readily be replaced by any rotating tool. Moreover, a gripping tool or the like could be mounted directly to extension housing 20 in place of the collet housing and motor housing, for maximum flexibility in the tool mounting system.

Clamping assembly 16 includes a central core 30 having a proximal or back plate 32 fastened to an end plate of a robotic arm, shown in phantom at 34. A plurality of openings 36 formed in back plate 32 permit it to be secured to end plate 34 by bolts. The core also includes first and second side flanges 38 and 40. A central guide pin opening 42 is provided in each flange, and first and second clamp fluid ports, shown at 44 and 46, are provided only in first side flange 38.

Mounted to core 30 are opposed upper and lower clamping members 48 and 50, both of which slide transversely with respect to the core, or upwardly and downwardly as viewed in FIG. 1. Provided in upper clamping member 48 are a plurality of first fluid conduit portions 52, and an upper sensor 54. A pair of upper guide pins, one of which is shown at 56, extend downwardly from clamping member 48.

A corresponding pair of lower guide pins, one of which is shown at 58, extend upwardly from lower clamping member 50. Guide pins 56 and 58 are axially aligned with each other and with central opening 42. The central opening is slightly larger than the guide pin diameters, so that when clamping assembly 16 is closed, opening 42 contains the free ends of guide pins 56 and 58. The opposite set of guide pins and their associated central opening are not shown, but are substantially identical.

A lower sensor 60 is provided in the lower clamping member, and cooperates with upper sensor 54 to provide an appropriate indication whenever clamping assembly 16 is closed. Also provided in the lower clamping member are a plurality of female electrical contacts 62, and a sensor bank 64 of five separate sensors. Selective sensors in sensor bank 64 can respond to indicia on tool support member 18, thus to individually identify each one of a multiplicity of tool support members.

Tool support member 18 is adapted for integral and interlocking engagement with clamping assembly 16 when it is closed. To this end, support member 18 is provided with four rearwardly extended legs, two of which are shown at 66 and 68. First and second guide pin openings 70 and 72 are formed in legs 66 and 68, respectively, and two additional guide openings are formed in the two additional legs. Extended upwardly from the top surface of the tool support member are a plurality of male fluid connectors 74, each adapted for connection to a corresponding female fluid connector in one of fluid conduit portions 52. A plurality of male electrical contacts 76 (FIG. 2) extend downwardly from the support member bottom surface, for engagement with the female electrical contacts in lower clamping member 50.

Figure 3:
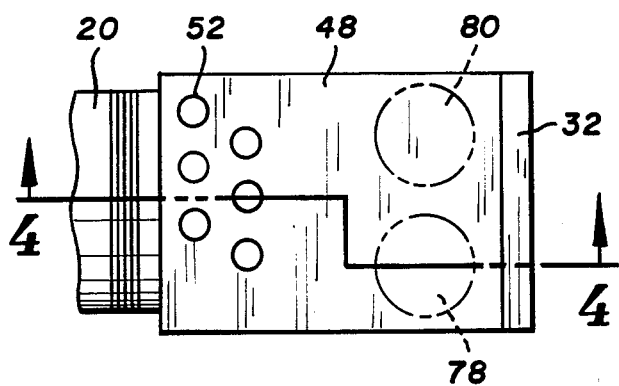
FIG. 3 is a partial top view of the apparatus.
Figure 4:
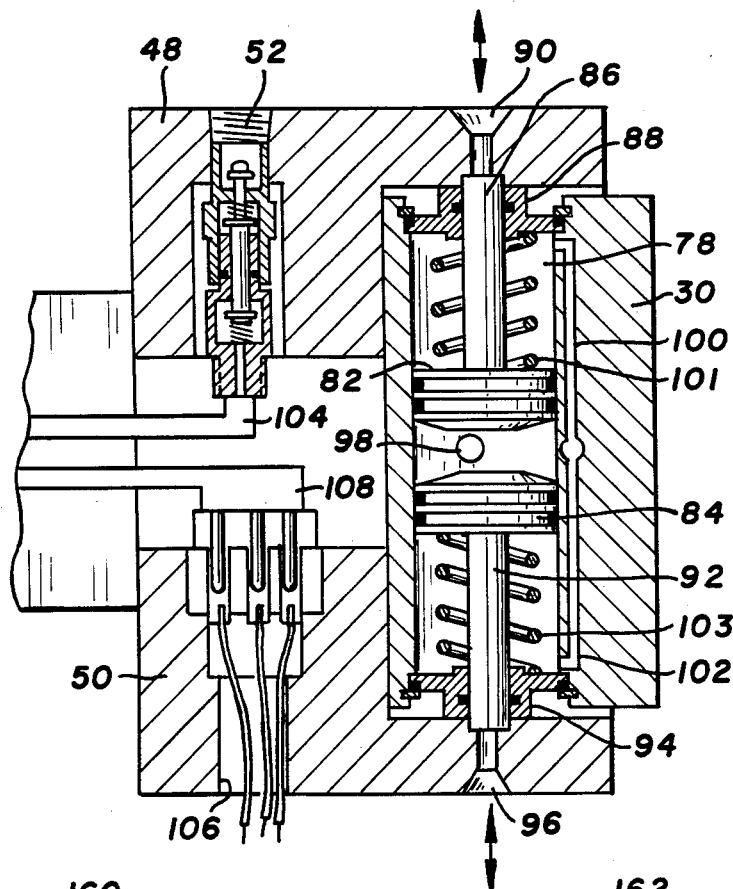
FIG. 4 is a sectional view taken along the line 4—4 in FIG. 3.

The broken lines in FIG. 3 locate first and second vertically or transversely extended clamp actuating cylinders 78 and 80 formed in core 30. The function of these cylinders is better appreciated in connection with FIG. 4 showing first cylinder 78, second cylinder 80 being substantially identical. Mounted in cylinder 78, in opposed reciprocating relation, are upper and lower clamping pistons 82 and 84. Mounted to upper piston 82 is an upper clamping piston rod 86, retained slidably in an upper rod support 88 and fastened to upper clamping member 48 by an upper rod fastener 90. Similarly, a lower clamping piston rod 92, attached to lower piston 84, slides with respect to a lower rod support 94 and is attached to the lower clamping member by a lower rod fastener 96. Consequently, clamping assembly 16 is closed and opened as pistons 82 and 84 move toward and away from one another.

Clamping piston motion is controlled by introduction of a fluid, for example a hydraulic fluid, either through first fluid port 44 or second fluid port 46. First fluid port 44 is open directly to the mid-portion of first cylinder 78, between pistons 82 and 84. Fluid entering the first cylinder through first port 44 is allowed to proceed into second cylinder 80 via a fluid passage 98 through the wall between the adjacent cylinders.

Thus, introduction of fluid into the clamp actuating cylinders through first fluid port 44 forces upper and lower clamping pistons 82 and 84, and the corresponding pair of pistons in cylinder 80, away from one another to open the clamping assembly. Experience has shown that providing fluid to second cylinder 80 through first cylinder 78 rather than by its own fluid path results in simultaneous movement of all four clamping pistons, due to their tendency to resist movement until an appreciable level of fluid pressure is attained. Fluid travels into the second cylinder, and fills the space between its associated pistons, well before reaching such pressure level.

Fluid for closing clamping assembly 16 is provided to the chambers through second fluid port 46, which extends horizontally into core 30 to a point approximately midway between cylinders 78 and 80. From this point, the fluid travels through an upper passageway 100, and a lower passageway 102, from which fluid enters both cylinders at their upper and lower end portions, respectively. Retaining springs 101 and 103 keep the clamping assembly closed in the absence of fluid pressure.

FIG. 4 also illustrates the integral, interlocking relationship between tool support member 18 and clamping assembly 16 when closed. The flat top surface of the tool support member lies flush against the lower, inwardly facing surface of upper clamping member 48, while the bottom surface of the tool support member is similarly engaged with an upwardly facing surface of lower clamping member 50. Also shown is the linkage of one of first fluid conduit portions 52 in the upper clamping member, with one of a plurality of second fluid conduit portions 104 formed in tool support member 18, to form a single fluid conduit. Likewise, a first electrical conduit portion 106 formed in the lower clamping member and a second electrical conduit portion 108 in the tool holder form a single electrical conduit having a plurality of conductive paths.

Three electrical paths are illustrated, each including a male contact 76 extended from the tool support member and engaged with a female contact 62 mounted in the lower clamping member. Preferably, contacts 62 are in a bank that can float slightly with respect to clamping member 50, to permit contacts 62 and 76 to align themselves as the clamping assembly is closed. It can be appreciated that any convenient member and arrangement of electricl contacts can be selected across the support member/lower clamping member interface. Fluid and electrical connectors (not shown) are added at the distal end of the tool support member 18 in accordance with the particular tool.

Each of the fluid connections includes one of male fluid connectors 74 and a corresponding female fluid connector 110 recessed in upper clamping member 48. Fluid connectors 74 and 110 include valves for allowing passage of fluid only when clamping assembly 16 is closed.

Figure 5:
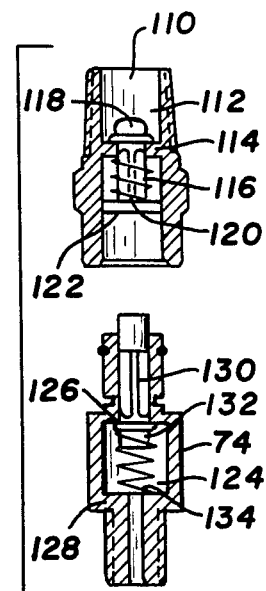
FIG. 5 is an elevational view showing mating fluid connectors employed in the apparatus.

FIG. 5 shows connectors 74 and 110 separated from one another, so that the valves are closed. Female connector 110 has a cylindrical passage 112 formed therethrough, and a ledge 114 extended across the passage. Mounted slidably in an opening in ledge 114 is a fluted stem 116 having a valve head 118. A coil spring 120, under compression between ledge 114 and a plate 122 on the lower end of the stem, tends to maintain head 118 against ledge 114, preventing passage of fluid through connector 110.

Male fluid connector 74 has an internal passage 124 formed therethrough, with an enlarged portion between upper and lower walls 126 and 128. A fluted stem 130 extends upwardly through an opening in upper wall 126. Attached to stem 130 is a valve head 132 which is urged against the upper wall by a coil spring 134 under compression between the head and lower wall 128.

As seen in FIG. 4, when clamping assembly 16 is closed, fluid connectors 74 and 110 engage, forcing stems 116 and 130 to contact one another. The stems then move valve heads 118 and 132 out of engagment with ledge 114 and wall 128, respectively, against the force of their associated coil springs, to allow passage of fluid through the conduit formed by conduit portions 52 and 104. As the clamping assembly is opened, each valve head returns to its closed position responsive to its associated spring, thus to rapidly cut off fluid flow.

Figure 6:
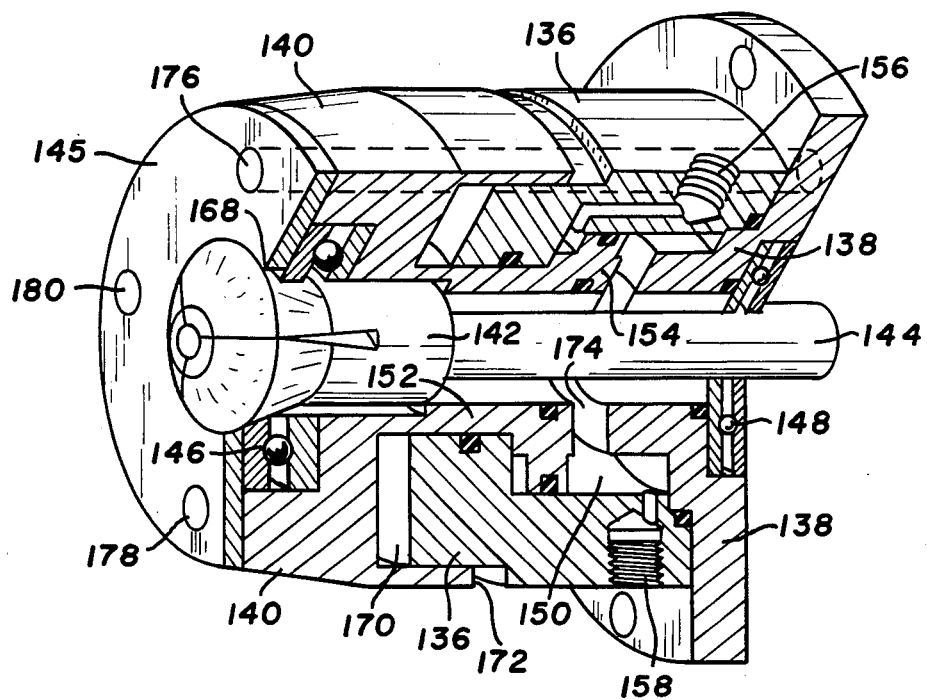
FIG. 6 is a perspective view of a collet housing of the apparatus, with a portion of the housing removed to illustrate structural detail.

As seen from FIG. 6, collet housing 24 includes a proximal outer housing section 136, a proximal inner housing section 138 integral with outer section 136, and a distal housing section 140 in longitudinal sliding relation to housing sections 136 and 138. The inner wall surfaces of inner housing section 138 and distal housing section 140 together define a collet opening in which is housed a collet assembly including a collet 142 and integral collet shaft 144. The housing further includes a distal plate 145 attached to housing section 140. A first bearing 146 between the collet and housing section 140, and a second bearing 148 between housing secion 138 and collet shaft 144, permit the collet assembly to rotate relative to the housing.

Housing sections 136, 138 and 140 further cooperate to form an annular collet housing actuating (extension and retraction) chamber 150 concentric with and surrounding the collet opening. A proximal segment 152 of the distal housing section extends rearwardly into actuating chamber 150. An enlarged portion of the proximal segment extends radially outward to span the distance across the actuator chamber, thus to provide an annular piston 154 within the chamber.

A first collet fluid conduit 156 is open to the actuator chamber at a point distal to annular piston 154, and a second collet fluid conduit 158 in turn is open to the actuator chamber proximally of the annular piston. Consequently the introduction of a fluid, for example air, into the first fluid conduit tends to move piston 154 rearwardly in chamber 150 to retract distal housing section 140, while fluid supplied to the chamber through the second fluid conduit tends to extend the distal housing section.

Figure 7:
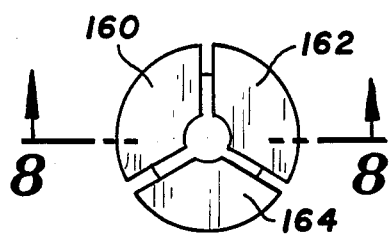
FIG. 7 is a frontal view of a collet supported in the collet housing.
Figure 8:
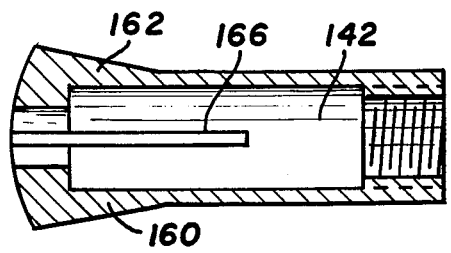
FIG. 8 is a sectional view taken along the line 8—8 in FIG. 7.

As seen from FIGS. 7 and 8, collet 142 has a flared distal end portion in which are formed first, second and third tool gripping members 160, 162 and 164. Normally, each of the gripping members are separated from one another by longitudinal slots as that shown at 166 in FIG. 8, where the gripping members are in an open position for insertion or removal of tools. The gripping members are sufficiently flexible to be moved into a closed, tool retaining position as illustrated in FIG. 6.

To maintain the gripping members closed, a rim 168 is provided in distal plate 145. The rim, inclined to complement the flared end of the collet, engages the flared end whenever distal housing section 140 is advanced toward the fully forward position shown in FIG. 6, further advancement beyond the point of initial rim contact tending to urge the gripping members together and thus close the collet. Such advancement of distal housing section 140 creates gaps between that section and outer housing section 136 such as shown at 170 and 172, and an internal gap 174 between housing section 140 and inner housing section 138. Consequently, a substantial contiguous surface area is provided between housing sections 136 and 140 in order to protect the collet housing interior from foreign matter.

A plurality of fluid ports 176 and 178, one for air and the other for lubricant, are provided through distal plate 145 and housing sections 136 and 140, thus to provide for convenient transmission of lubricant and pressurized air to the proximity of a tool mounted in the collet. Also mounted in the distal plate and distal housing section is a sensor 180, which can be a proximity sensor or a distance sensor. Preferably, at least one of each type of sensor is provided to determine the location of a tool contained in collet 142 with respect to a workpiece.

Figure 9:
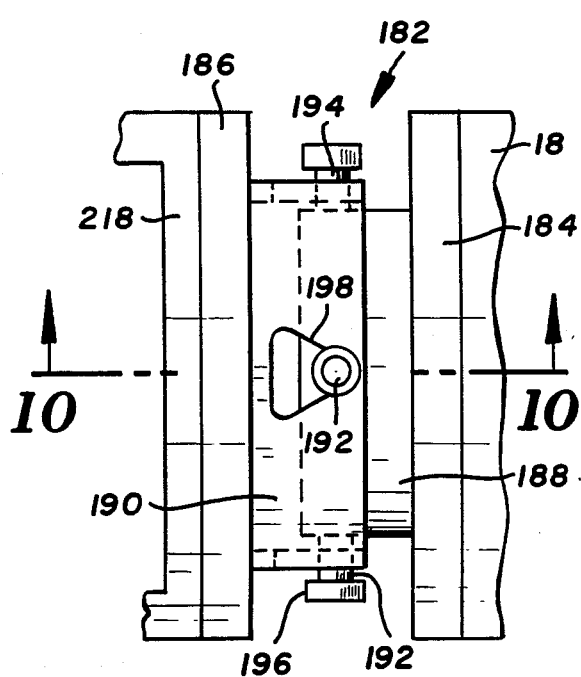
FIG. 9 is a side elevation of an overload protect wrist of the apparatus.

FIG. 9 shows an overload protect wrist 182 contained in extension housing 20, bellows 28 being removed for purposes of illustration. Wrist 182 includes a proximal wrist segment 184 fastened to tool support member 18, and a complementary distal wrist segment 186. Wrist segments 184 and 186 have integral, overlapping first and second sleeves 188 and 190, respectively, fastened together by four symmetrically arranged retainers 192 mounted in first sleeve 188. Each retainer 192 includes a shank 194 and an enlarged head 196. Each shank extends through an associated one of four generally triangular openings 198 formed in second sleeve 190.

Figure 10:
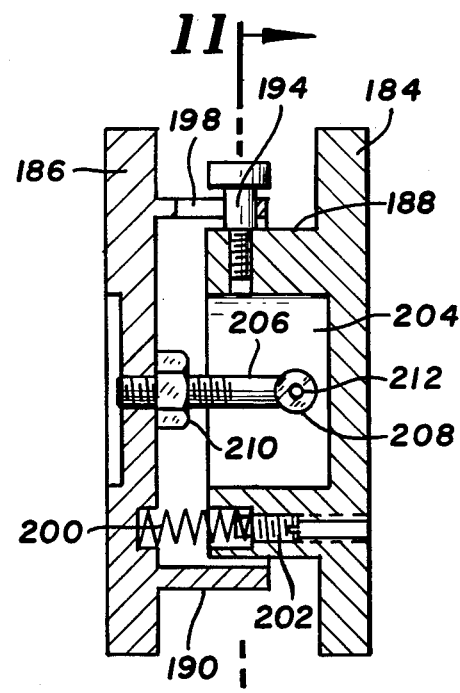
FIG. 10 is a sectional view taken along the line 10—10 in FIG. 9.

As perhaps best seen in FIG. 10, sleeves 188 and 190 are spaced transversely apart from one another, and heads 196 are spaced apart from second sleeve 190, all to provide for limited transverse and angular movement of wrist segments 184 and 186 with respect to each other. Part of the section providing FIG. 10 is rotated 45° to reveal one of four coil springs 200 in compression between the wrist segments. Coaxial with each spring, and threadedly mounted in proximal wrist segment 184, is an adjustment member 202. The adjustment members can be advanced or retracted in wrist segment 184 in order to adjust the amount of compression in springs 200.

Due to the force of springs 200, retainers 192 are urged against the proximal edges of their associated triangular openings 198, i.e. at the merger of the two proximally converging sides of each opening. Wrist segments 184 and 186 are then in a desired configuration relative to each other, with first and second sleeves 188 and 190 spaced apart from one another and centered on the longitudinal axis.

As seen from FIG. 10, wrist segments 184 and 186, when selectively configured, form a wrist chamber 204 essentially closed except for the space between the sleeves. Inside the chamber is a position indicator including a standard 206 threaded into distal wrist segment 186, and an enlarged tubular head 208. Standard 206 is further secured by a lock nut 210. An aperture 212 in tubular head 208 acts as a position indicator, as is later explained.

Figure 11:
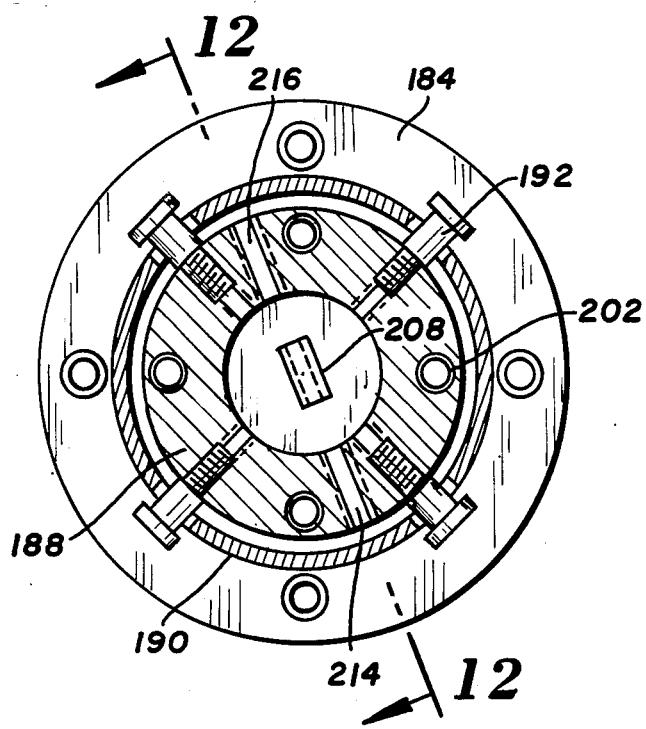
FIG. 11 is a sectional view taken along the line 11—11 in FIG. 10.

The coaxial arrangement of sleeves 188 and 190, and the spacing between them, are illustrated in FIG. 11, which also shows the symmetry of retainers 192 around first sleeve 188. Adjustment members 202, threadedly mounted in the sleeve, are likewise symmetrical, but offset from the retainers by 45°.

Figure 12:
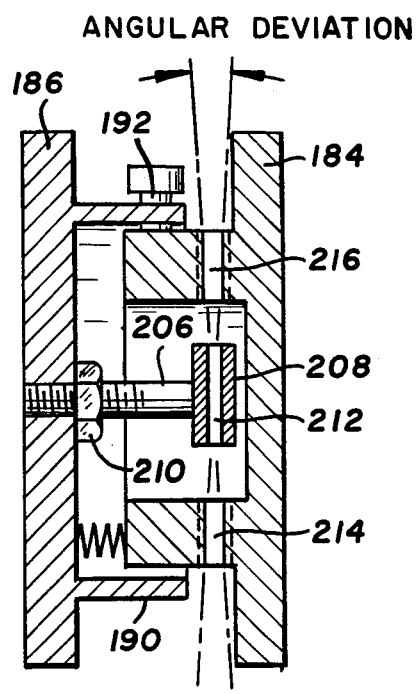
FIG. 12 is a sectional view taken along the line 12—12 in FIG. 11.
Figure 13:
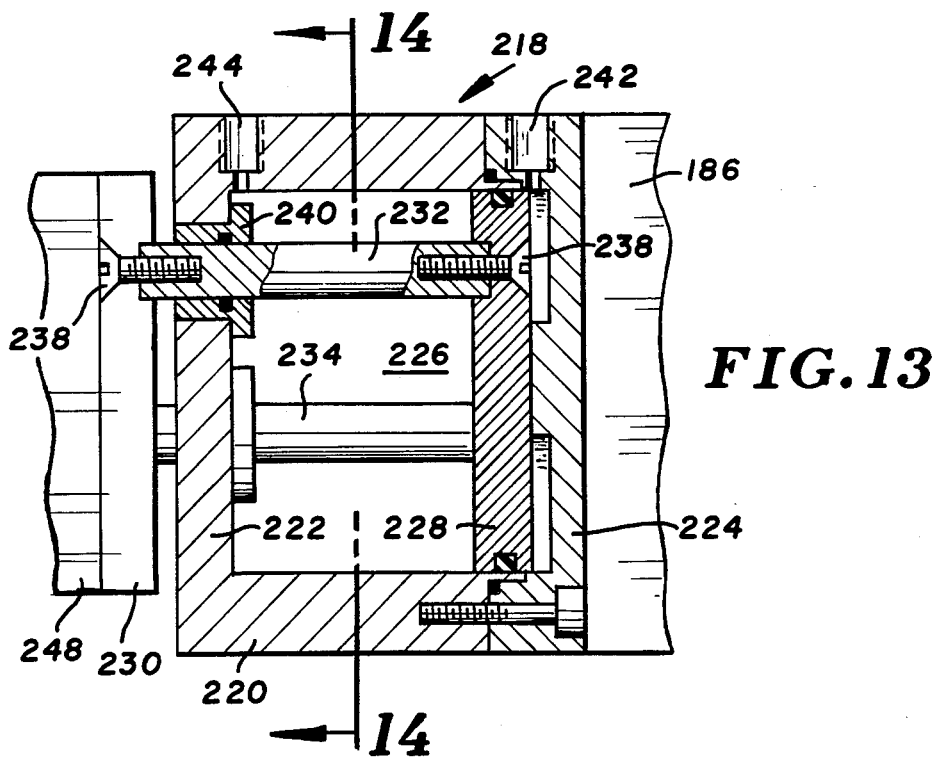
FIG. 13 is a side elevation of an extension device of the present apparatus.
Figure 14:
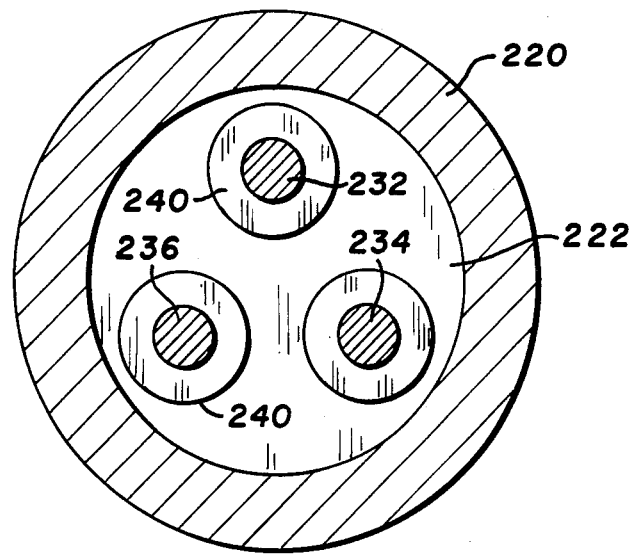
FIG. 14 is a sectional view taken along the line 14—14 in FIG. 13.

Angularly offset from the retainers and the adjustment members are a light source 214 and an optical sensor 216 across from the light source. As seen from FIG. 12, when wrist segments 184 and 186 are in the select configuration with respect to each other, light from source 214 is permitted to pass through aperture 212 to sensor 216. Also, it can be appreciated from FIG. 12 that a deviation from the desired configuration, whether by longitudinal, transverse or angular movement of one of the wrist segments with respect to the other, eventually moves aperture 212 out of the optical path to prevent light from reaching sensor 216. Aperture 212 is oversized to permit slight angular and linear deviations. However, when the accumulated deviation exceeds a permitted amount, light from source 214 ceases to reach the optical sensor and a controller (not shown), responsive to an indication by the sensor that it no longer receives light, selectively terminates the power supply to the robot, for example to halt movement of the arm or a clamping tool, or to halt rotation of drill bit 26.

By virtue of adjustment members 202, the amount of force required to displace wrist segments 184 and 186 beyond the permitted amount can be varied and thus selected to meet particular needs. Specifically, as adjustment members 202 are advanced toward distal wrist segment 186, the compression force in springs 200 is increased, requiring increased force to exceed the permitted displacement.

Each of retainers 192 is angularly offset 90° from its next adjacent retainers, and is coaxial with its opposite retainer. This permits relative rocking of the wrist segments about mutually perpendicular transverse axes, for maximum freedom of movement of the segments relative to each other. In addition, due to the spacing between the sleeves, and between sleeve 190 and the heads of the retainers, linear transverse displacement and torsional displacement about a longitudinal axis is permitted, as well as longitudinal linear movement.

Fastened to distal wrist segment 186 is a linear extension device 218 having a casing 220 including a distal wall 222 and an opposed proximal wall 224 mounted to the distal wrist segment. Formed in the casing is an extension chamber 226, and a proximal plate 228, mounted in chamber 226, acts as a piston, reciprocating longitudinally between a retracted position as shown, and an advanced position near distal wall 222.

Outside of casing 220 is a distal plate 230 coaxial with the proximal plate and connected to it by first, second and third parallel rods 232, 234 and 236 arranged about the plate peripheries. One end of each rod is fastened to each of the plates by a fastener 238. Each rod extends through, and is slidable with respect to, a rod support member 240 mounted in an opening in distal wall 222.

Proximal and distal fluid contains 242 and 244 extend through casing 220 into chamber 226 on opposite sides of proximal plate 228, enabling the extension or retraction of distal plate 230 by selectively supplying fluid to the chamber through one or the other conduit. Bellows 28, outside of the extension casing, extends and folds in accordion-like fashion to accommodate extension and retraction of the distal plate.

Mounted distally of casing 220 is a compliant wrist 246. The compliant wrist includes a proximal wrist plate 248 secured to distal plate 230, and an opposed distal wrist plate 250 spaced apart from and normally parallel to plate 248, with both plates normally centered on the longitudinal axis.

A biasing means for urging plates 248 and 250 away from one another includes a relatively thick walled tube 252 of rubber or a flexible plastic, and a coil spring 254 extending between the wrist plates. Like tube 252, coil spring 254 is centered on the longitudinal axis. Moreover, the spring preferably is embedded in the tube, a result that can be obtained by forming the tube by injection molding with spring 254 already in place.

A wrist fastening assembly keeps wrist plates 248 and 250 against the tube and coil spring. The fastening assembly includes a central shaft 256 extended through oversized openings 258 and 260 in plates 248 and 250, respectively. A first plate retention member 262 is fastened at one end of shaft 256, and has a convex surface directed inwardly of compliant wrist 246 for slidable, face-to-face engagement with a first spherical indentation 264 formed in wrist plate 248. Retention member 262 is maintained against a flared head portion of the shaft.

At the opposite end of shaft 256 is a second plate retention member 266 having internal threads to match external threads provided at that end of the shaft. Second retention member 266 has a convex surface directed inwardly of the compliant wrist for surface engagement with a second spherical indentation 268 formed in distal wrist plate 250.

Figure 15:
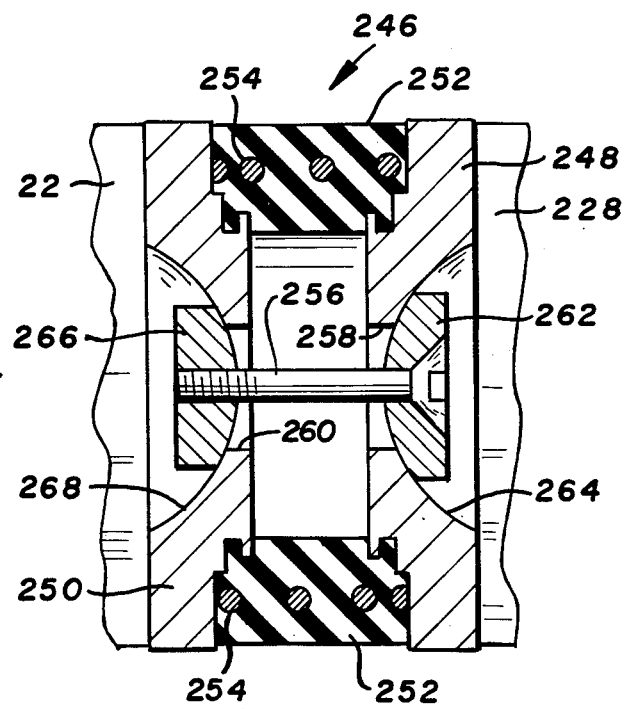
FIG. 15 is a side sectional elevation of a compliant wrist of the apparatus.

Due to the elasticity of tube 252 and spring 254 in all directions, compliant wrist 246 permits displacement of wrist plates 248 and 250 with respect to each other: transversely; angularly in terms of rotation about the longitudinal axis; angularly in terms of rotation about any transverse axis; and longitudinally towards one another. The degree of compliance, i.e. the amount of force necessary to produce a particular displacement, can be adjusted by advancing or retracting second retention member 266 on shaft 256. For example, when the retention member is advanced or moved to the right as viewed in FIG. 15, a greater force is required to produce a given displacement between the wrist plates.

Overload protect wrist 182, linear extension device 218 and compliant wrist 246 together provide for a compliant mounting of drill bit 26 with respect to a robot arm, in that the drill bit axis need not be coaxial with, or even parallel to, the robot arm axis or tool support member axis. This compliance enables the use of a guide structure, integral with a workpiece, for capturing drill bit 26 whenever it is at least close to its desired hole drilling position, and then centering the drill bit as it is moved toward the workpiece by the robotic arm. The compliance reduces cost in the robotic's system by permitting wider tolerances during initial positioning of the bit or other tool. In the event that initial positioning falls short of the relaxed tolerances, the amount of correction necessary to center the drill bit exceeds the displacement permitted by the overload protect wrist and the system is disabled, thus avoiding damage to the workpiece, guide or robot.

What is claimed is:

1. Apparatus for operatively and interchangeably supporting tools with respect to a robotic arm, including:
- a core, and means for mounting said core to said arm whereby the core extends outward from said arm in a longitudinal direction;
- first and second clamping members, and a mounting means for mounting said clamping members on opposite sides of said core for transverse movement between a closed position with the clamping members relatively near each other, and an open position with the clamping members relatively remote from each other;
- a first guide pin mounted to said first clamping member and extending in the transverse direction towards the second clamping member;
- a second guide pin axially aligned with said first guide pin, substantially equal in diameter to said first pin, mounted to said second clamping member and extending in said transverse direction toward the first clamping member;
- a tool support member including means forming a first opening in said tool support member slightly larger in diameter than said first pin and positionable in alignment with said first pin, and a second opening in said support member slightly larger in diameter than said second pin and axially aligned with said first opening, said support member selectively positionable between the first and second clamping members to substantially axially align said openings with said first and second guide pins, whereby said first and second pins lockingly engage said first and second openings, respectively, as said clamping members are moved to the closed position to integrally secure said tool support member between said clamping members; and
- means forming an aperture in said core slightly larger in diameter than said first and second pins and containing first and second free ends of said first and second guide pins, respectively, when the clamping members are in the closed position.

2. The apparatus of claim 1, further including:
a first conduit means in said first clamping member open to an inwardly facing surface thereof, and a second conduit means in said tool support member open to a first outside surface thereof, said first and second conduit means being operatively engaged when said tool support member is integrally secured between the clamping members.

3. The apparatus of claim 2, including:
a third conduit means in said second clamping member open to an inwardly facing surface thereof, and a fourth conduit means in said support member open to a second outside surface thereof, said third and fourth conduit means being operatively engaged when said support member is integrally secured between said clamping members.

4. The apparatus of claim 3, wherein:
said first and second conduit means comprise at least one fluid conduit, and said third and fourth conduit means comprise at least one electrically conductive path.

5. The apparatus of claim 2 including:
a fluid flow impedance means for preventing passage of fluid between said first and second conduit means unless said first and second clamping members are in the closed position with said tool support member integrally secured therein.

6. The apparatus of claim 1 wherein:
an inwardly facing surface of the first clamping member and a first outside surface of the tool support member are contiguous, and an inwardly facing surface of the second clamping member and a second outside surface of the tool support member are contiguous, whenever the tool support member is integrally secured between the clamping members.

7. The apparatus of claim 1 wherein:
said means for mounting said clamping members includes at least one cylinder formed in said core, first and second opposed pistons mounted in said cylinder for opposite reciprocal motion between a central portion and respective first and second opposite outer portions of said cylinder, a first piston rod for connecting said first piston to said first clamping member; a second piston rod for connecting said second piston to said second clamping member; a first fluid conduit for introducing fluid to said cylinder at a central region thereof, and a second fluid conduit for introducing said fluid into said cylinder at opposite outer regions thereof.

8. The apparatus of claim 7 wherein:
said clamping member mounting means includes adjacent and parallel first and second cylinders, said first and second opposed and oppositely reciprocating pistons mounted in said first cylinder, and third and fourth opposed and oppositely reciprocating pistons in said second cylinder, each pair of opposed pistons reciprocating between a central region of its associated cylinder and opposite outer regions thereof;
wherein said first fluid conduit introduces fluid into said first cylinder, and fluid from said first cylinder travels to the central region of said second cylinder through a fluid passage between said first and second cylinders.

9. The apparatus of claim 1 wherein:
said first and second free ends of said respective guide pins are positioned proximate one another when the clamping members are in the closed position.

10. An apparatus for operatively and interchangeably supporting tools with respect to a robotic arm, including:

a core, and means for mounting said core to said arm whereby the core extends outward from said arm in a longitudinal direction;

first and second clamping members, and a mounting means for mounting said clamping members on opposite sides of said core for transverse movement between a closed position with the clamping members relatively near each other, and an open position with the clamping members relatively remote from each other;

a first guide pin mounted to said first clamping member and extending in a transverse direction toward the second clamping member;

a tool support member including means forming a first opening in said tool support member slightly larger than said first pin and positionable in alignment with said first pin, said support member selectively positionable between the first and second clamping members to substantially axially align said opening with said guide pin, whereby said first pin lockingly engages said opening as said clamping members are moved to the closed position to integrally secure said tool support member between said clamping members;

a first conduit means in said first clamping member open to an inwardly facing surface thereof and a second conduit means in said tool support member open to a first outside surface thereof, said first and second conduit means being operatively engaged when said tool support member is integrally secured between the clamping members; and a fluid flow impedance means for preventing passage of fluid between said first and second conduit means unless said first and second clamping members are substantially in the closed position with said tool support member integrally secured therein, said impedance means including: a first valve head mounted movably with respect to said first clamping member, a first valve stem integral with said first valve head, and a first biasing means for urging said first head into a fluid blocking position within said first conduit means to prevent passage of fluid through the first conduit means;

said impedance means further including a second valve head mounted movably with respect to said tool support member, a second valve stem integrally mounted with respect to said second valve head, and a second biasing means for urging said second head into a fluid blocking position within said second conduit means to prevent passage of fluid through said second conduit means; and said first and second valve stems being disposed to contact one another as said first and second clamping members are moved toward said closed position to integrally secure said tool support member between the clamping members, and, following contact, to move said first and second valve heads away from their fluid blocking positions responsive to continued movement of said clamping members toward the closed position, thereby to permit the passage of fluid through said first and second conduit means.

11. The apparatus of claim 10 wherein:

said first biasing means comprises a first coil spring under compression and surrounding said first stem, and said second biasing means comprises a second coil spring under compression and surrounding said second valve stem.

* * * * *